US008320293B2

(12) United States Patent
Zheng et al.

(10) Patent No.: US 8,320,293 B2
(45) Date of Patent: Nov. 27, 2012

(54) METHOD AND APPARATUS FOR CONTROLLING UPLINK MULTICAST SERVICE

(75) Inventors: Dayong Zheng, Shanghai (CN); Yingzhong Miao, Shanghai (CN)

(73) Assignee: Alcatel Lucent, Paris (FR)

( * ) Notice: Subject to any disclaimer, the term of this patent is extended or adjusted under 35 U.S.C. 154(b) by 182 days.

(21) Appl. No.: 12/733,740

(22) PCT Filed: Feb. 25, 2008

(86) PCT No.: PCT/CN2008/000392
§ 371 (c)(1),
(2), (4) Date: Mar. 18, 2010

(87) PCT Pub. No.: WO2009/049461
PCT Pub. Date: Apr. 23, 2009

(65) Prior Publication Data
US 2010/0195651 A1     Aug. 5, 2010

(30) Foreign Application Priority Data
Oct. 19, 2007 (CN) .......................... 2007 1 0047270

(51) Int. Cl.
*H04H 20/71* (2008.01)
(52) U.S. Cl. ........................................ 370/312; 370/390
(58) Field of Classification Search .................. 370/312, 370/390
See application file for complete search history.

(56) References Cited

U.S. PATENT DOCUMENTS

| 2007/0115975 A1 | 5/2007 | Zhang |
| 2007/0127459 A1* | 6/2007 | Lo et al. ........................ 370/389 |
| 2008/0123648 A1* | 5/2008 | Ooghe et al. .................. 370/390 |
| 2009/0219934 A1* | 9/2009 | Deshpande .................... 370/390 |

FOREIGN PATENT DOCUMENTS

| CN | 1567837 | 1/2005 |
| CN | 1756210 | 4/2006 |
| CN | 1889448 | 1/2007 |
| CN | 1960321 | 5/2007 |
| CN | 101013950 | 8/2007 |

* cited by examiner

*Primary Examiner* — Jung Park
(74) *Attorney, Agent, or Firm* — Harness, Dickey & Pierce, P.L.C.

(57) ABSTRACT

The present invention provides a method and apparatus for controlling the transmission of uplink multicast service data in communication network. According to the invention, a user equipment sends request to a multicast controlling device for the permission of providing uplink multicast data stream; once the uplink multicast controlling device has verified and accepted the request, it will assign multicast address, bandwidth, valid time for it and update the uplink multicast forwarding table at the access device to establish an uplink multicast dedicated VLAN. After that, the access device will forward multicast data from the UE according to the uplink multicast forwarding table configured by the uplink multicast controlling device, to be specific, allowed multicast packets to be forwarded into the uplink multicast dedicated VLAN, and get to the multicast router via the uplink multicast dedicated VLAN. Finally, the multicast router will take the responsibility of multicast distributing of the uplink multicast service data. Based on the present invention, the access of uplink multicast and the data transmission can be well controlled, the multicast routers provide multicast service to the network in a centralized manner. Also, this is compatible with the existing multicast and unicast services.

13 Claims, 6 Drawing Sheets

METHOD AND APPARATUS FOR CONTROLLING UPLINK MULTICAST SERVICE

TECHNICAL FIELD

The invention relates to field of telecommunication, and particular to a method and apparatus for controlling uplink multicast service when the multicast source is located at the side of user equipment.

BACKGROUND OF THE INVENTION

As a communication manner different from unicast or broadcast, multicast makes "one point sending, multi-point receiving" possible effectively, and is helpful to save bandwidth so as to alleviate burdens on the network. Further, with the multicast characteristic, service provider can provide some new value-added services to consumers conveniently, such as online live, network telecast, remote education, remote healthcare, network radio, real-time video conference, etc.

Taking some widely used multicast service, IPTV, as an example, the multicast source, namely the equipment which initially sends the multicast data out, is generally located at the network side, e.g. content distribution network (CDN). IPTV also has corresponding solutions for multicast service management, the user multicast permission management and multicast charging management.

Along with the growth of network bandwidth, end users are not satisfied with being just service receivers, hence, there comes the need of setting multicast source device at the user side. Hereinafter, multicast, the multicast sources of which are located at the side of users, will be referred to as uplink multicast, and the multicast source for the uplink multicast will be referred to as uplink multicast source, accordingly, traditional multicast, the multicast sources of which are located at the network side, will be referred to as downlink multicast.

However, in view of the complexity of uplink multicast service and some economy factors, the operators and service providers prohibit uplink multicast service in traditional access network. Moreover, in traditional multicast protocols and also the related standards for control, there is few solution for the access control, bandwidth control for uplink multicast.

According to the prior art, there are two solutions to support uplink multicast services:

Solution 1: user equipments (UE) send data streams which are expected to be multicasted in the form of unicast data to the network side, the unicast data will be then converted into multicast data after being processed by a dedicated device at the network side, later, the consequent multicast data will be conveyed to a multicast device, without loss of generality taking a multicast router as an example, which will then provide multicast service to other UEs.

Although solution 1 make it possible that a UE can provide service data to other UEs, the UE is still sending unicast data, more than this, people find no favor with solution 1 for the following reasons: a conversion device is required for the conversion from unicast to multicast, which raises the cost for the operators and service providers; the conversion is quite resource (e.g. the processing capability of the hardware) consuming.

Solution 2: an end to end transparent service channel, sourced from the UE to the multicast router at the network side, is established for each UE which needs to send multicast service. All uplink data including multicast data and unitcast data from that UE will be forwarded to a dedicated cross connected VLAN (CC-VLAN) which is like a special line in special line communication, by doing so, the multicast data stream will reach the network side and be provided to other UEs by the multicast router(s).

Solution 2 is not perfect either. First, both unicast data and multicast data will get directly to the network side where the multicast server is located, the uplink data can not be filtered or controlled necessarily in access network by the operators and service providers; second, it costs a large number of VLAN resources to establish a dedicated CC-VLAN for every UE having the need of sending multicast data, and hence does not fit for commercial application; third, whilst applying solution 2 to a UE, the UE can not request multicast service provided by other UEs on demand or carry out its normal unicast service.

In view of the above, an optimized solution for controlling the transmission of uplink multicast service data is needed, preferably, the solution should neither occupy very much network resources nor impact other normal services of the UE.

SUMMARY OF THE INVENTION

According to at least one embodiment of the invention, an uplink multicast controlling device such as an uplink multicast service management server is used for centralized control of the access of uplink multicast, and an access device such as digital subscriber line access multiplexer (DSLAM) is responsible for filtering uplink multicast service data.

In case that a UE needs to provide uplink multicast service to the network, it firstly sends a request to the uplink multicast controlling device, if the request is approved, the uplink multicast controlling device will configure the access device to which the UE belongs, that's to say, the UE is associated with a particular VLAN dedicated for the transmission of uplink multicast data. Hereinafter, such VLAN will be referred to as uplink multicast dedicated VLAN. After getting the confirmation from the uplink multicast controlling device, the UE will send multicast packets to the access device, which will then filter the multicast packets according to pre-stored multicast control information, if the packets are allowed to be forwarded, the access device will forward the packets to a multicast router via the uplink multicast dedicated VLAN. Thereafter, the multicast router will take the role as the root node of the multicast tree to provide multicast service to other UEs.

In general, a UE is required to have existing unicast internet service channel before having its IPTV service. Thus, a UE normally has a unicast basic service channel which is well configured. After the present invention is introduced, a UE as the multicast source may still need to send out unicast packets or other kinds of packets, e.g. request message to request for multicast service provided by other multicast sources. The access device will forward these unicast packets and service packets into the unicast basic service channel. Therefore, the present invention brings no impact to traditional unicast service.

According to a first aspect of the invention, there is provided a method for, in an access device of a communication network, controlling the uplink multicast service from a user equipment, comprising the steps of: a. receiving a multicast packet from the user equipment through a user side port of said access device; b. obtaining the multicast property information of the multicast packet; d. according to the multicast property of the multicast packet and uplink multicast control information in relation to said user side port, determining whether the uplink multicast forwarding of the multicast packet is allowed; e. if the uplink multicast forwarding of the multicast packet is allowed, sending the multicast packet to a multicast router via a uplink multicast dedicated VLAN between the access device and the multicast router, which will then provide multicast service to other user equipments.

According to a second aspect of the invention, there is provided a method for, in an uplink multicast controlling device of a communication network, assisting the control of uplink multicast service from a user equipment, comprising the steps of: —generating a control information update indication message including update indication information for updating uplink multicast control information in correspondence with a user side port on an access device dominated by the uplink multicast controlling device; —sending the generated control information update indication message to said access device. Wherein the control information update indication message is a specifically defined control packet, or realized through the management interface of the access device, such as SNMP, Telnet, TL1, CLI, etc.

According to a third aspect of the invention, there is provided a uplink multicast controller for, in an access device of a communication network, controlling the uplink multicast service from a user equipment, comprising: an uplink multicast receiver configured to receive a multicast packet from the user equipment through a user side port of said access device; a property information obtaining means configured to obtain the multicast property information of the multicast packet; multicast determining means configured to, according to the multicast property information of the multicast packet and uplink multicast control information in relation to said user side port, determine whether the uplink multicast forwarding of the multicast packet is allowed; multicast transmitter configured to, if the uplink multicast forwarding of the multicast packet is allowed, send the multicast packet to a multicast router via a uplink multicast dedicated VLAN between the access device and the multicast router, which will then provide multicast service to other user equipments.

According to a fourth aspect of the invention, there is provided a multicast assisting controller for, in an uplink multicast controlling device of a communication network, assisting the control of uplink multicast service from a user equipment, comprising: an update message generator configured to generate a control information update indication message including update indication information for updating uplink multicast control information in correspondence with a user side port on an access device dominated by the uplink multicast controlling device; an update message transmitter configured to send the generated control information update indication message to said access device.

The advantages of the invention includes the follows:
the invention makes it possible to effectively control and manage uplink multicast service in broadband access network, packets do not need to be converted for times, and the unicast-multicast converter in solution 1 can be omitted.
for uplink multicast service, the manner of joining a multicast group used in the invention is compatible with the traditional one, i.e. the request from other UEs for joining the multicast group will be dealt with by a router which also maintains the information of the members of the group. Therefore, there will be no join request from a UE (multicast service receiver) to another UE (multicast source), so as to be compatible with the multicast service in existing network.
uplink multicast services belonging to different UEs dominated by the same access device can share a same uplink multicast dedicated VLAN. Hence, in practical application of the invention, the quantity of VLANs demanded is not large, which is suitable for large scale commercial use.
only multicast packets of uplink multicast service authorized by the uplink multicast controlling device can pass the filter performed by access device and be forwarded to the uplink multicast dedicated VLAN and get to the multicast router, while other unauthorized multicast packets will be discarded at the access device. Meanwhile, unicast packets and packets of other protocol kind are still transmitted in unicast VLAN of the UE. Therefore, the present invention does not impact traditional services of a UE serving as an uplink multicast source or the services of other UEs.

BRIEF DESCRIPTION OF THE DRAWINGS

Other features, aspects and advantages of the present invention will become obvious by reading the following description of the non-limited embodiments with the aid of appended drawings.

Wherein, same or similar reference numerals refer to the same or similar steps or means.

DETAILED DESCRIPTION OF EMBODIMENTS

Embodiments of the invention will be described with reference to the appended drawings.

Figure 1:
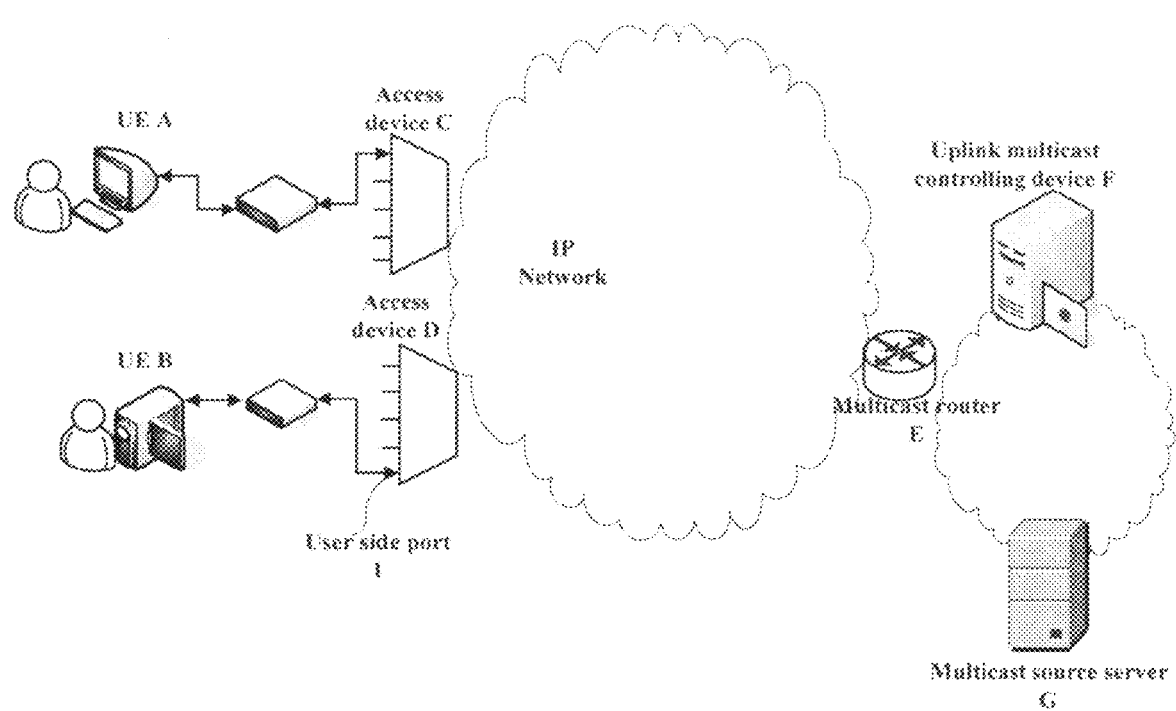
FIG. 1 is an diagram of a communication network based on the control mechanism for uplink multicast service according to one embodiment of the invention.

FIG. 1 is an diagram of a communication network based on the control mechanism for uplink multicast service according to one embodiment of the invention, wherein for conciseness only UE A, B, the access device C to which UE A belongs, the access device D to which UE B belongs, multicast router E at the network side, uplink multicast controlling device F and multicast source server G are shown.

For the ease in understanding the content below, the devices shown in FIG. 1 are introduced as followings:

UE A, typically formed by a set-top box (STB), personal computer (PC), cell phone, etc, is connected to a user side port (hereinafter referred to as "port" for short) of the access device C via a modem in a wired/wireless way. Also, UE A informs multicast router E of the multicast group it wants to join by using group member relationship protocols such as typical internet group management protocol (IGMP) under IPv4, multicast listener discovery (MLD) protocol under IPv6 etc. Without loss of generality, IGMP will be taken as an example hereinafter. Those skilled in the art should appreciate that in traditional IPTV services, the multicast source server G in FIG. 1 typically serves as a multicast source.

UE B, typically formed by an IP network camera or a computer capable of providing multicast stream out, is connected to the port 1 of access device D via a modem in a wired/wireless way. In this embodiment, UE B serves as a multicast source to provide other UEs with multicast services.

Access devices C and D, typically formed by a DSLAM, LAN SWITCH, or an access device in GPON/EPON, is located between the multicast router E and the UEs. For traditional downlink multicast service originated from multicast source server G in FIG. 1, according to the prior art, access devices C and D are responsible for copying the downlink multicast data stream from the multicast source server G for each UE under their respective domination which has requested for this multicast service. Hereinafter, a DSLAM in the DSL network will be taken as an example without loss of generality.

To be specific, access devices C and D can handle the join request message, which is for requesting to join a multicast group so as to receive the corresponding multicast service data, from the UEs under their respective domination by realizing multicast protocol function like IGMP/MLD proxy, and make response to the request message according to the process result: in case that the multicast service data stream requested by a UE has been pre-pushed to the access device, the access device will copy the multicast service data to the UE, otherwise the access device will forward the join request message to the multicast router E at the network side. After the introduction of the present invention, access devices C and D will be capable of filtering the uplink multicast data from the UEs under their respective domination, and act as the start points of uplink multicast dedicated VLANs to convey the uplink multicast data allowed for multicast to the multicast router.

Multicast router E, which is the closest to the UEs A and B among the routers, acts as a rendezvous point of the multicast service to collect multicast data from the UEs and multicast source server G and provide multicast service to the network. Multicast router E also takes the role of the end point of the uplink multicast dedicated VLAN occupied by the uplink multicast service data sent by UE B.

Uplink multicast controlling device F, an important equipment used by the network operator for the purpose of management and control of uplink multicast users, has stored user information, multicast permission configuration information etc in a centralized way.

Multicast source server G, a kind of widely used multicast source in traditional IPTV which provides multicast service from the network side to the UEs, with the introduction of the present invention, a normal UE is allowed to provide multicast service to other UEs as the multicast source server G does.

Figure 2:
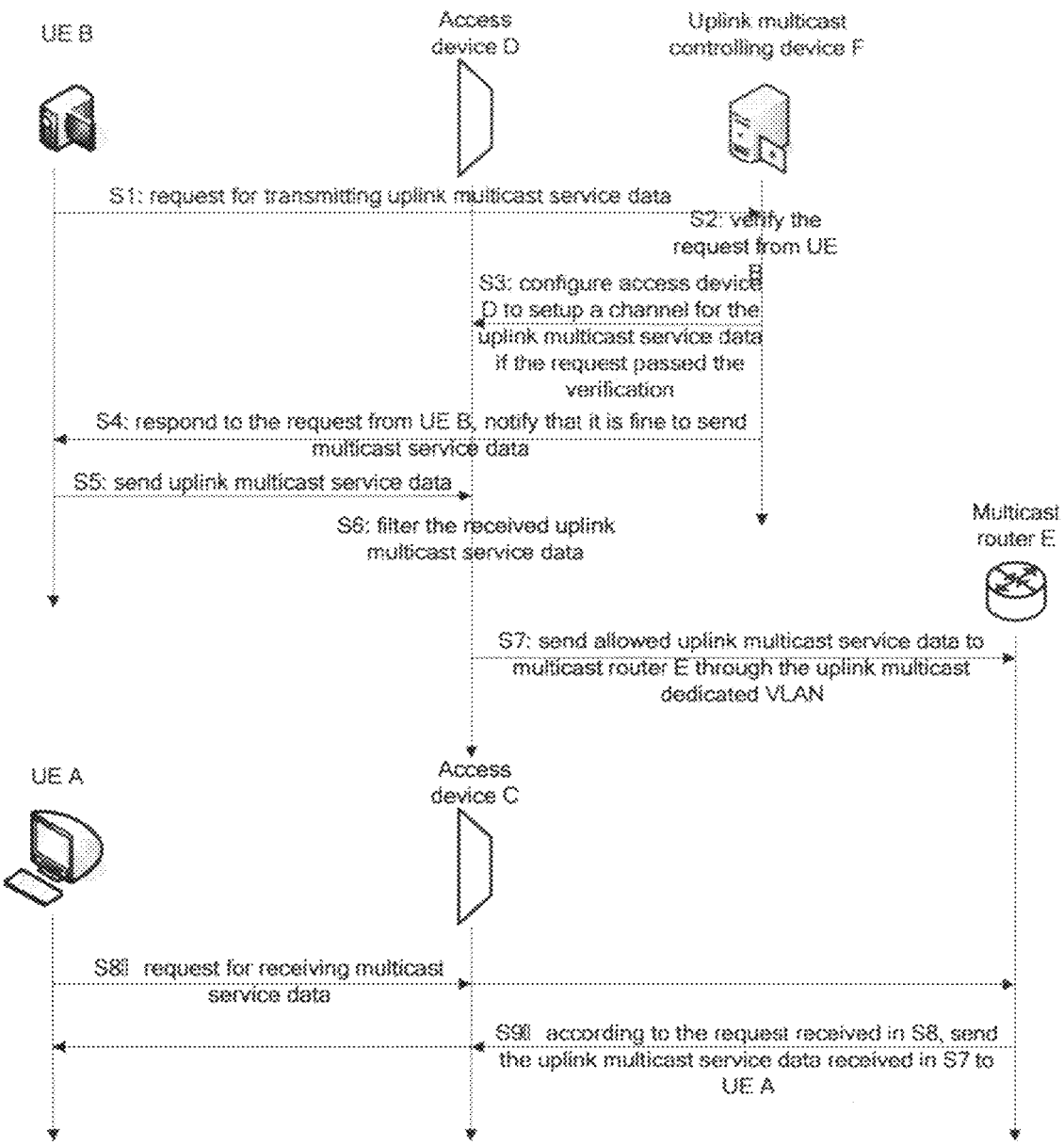
FIG. 2 shows a systematic flowchart of the method for controlling the uplink multicast service in communication network according to an embodiment of the present invention.

Now the flow of the method for controlling uplink multicast service provided by the present invention will be described in a systematic view with reference to FIG. 2.

In step S1, UE B sends a multicast transmission request message to the uplink multicast controlling device F, so as to request for providing uplink multicast service data to the network. The multicast transmission request message is typically based on HTTP or HTTPS and carried out by inputting user name and password. According to an embodiment of the invention, the multicast transmission request message sent by UE B includes the identity information of the user in correspondence with UE B.

In step S2, uplink multicast controlling device F verifies the multicast transmission request message based on its pre-stored user information, multicast permission configuration information and the user identification information in the multicast transmission request, and get a verification result which indicates whether UE B will be allowed to provide multicast service to other UEs in the communication network in FIG. 1. According to this embodiment, supposing the multicast transmission request message has passed the verification.

Consequently, the method enters step S3, wherein the uplink multicast controlling device F configures the access device D dominating UE B in view of the multicast transmission request that passed the verification, in order for the access device D to filter the subsequent uplink multicast service data. According to a preferable embodiment of the invention, uplink multicast controlling device F creates a new multicast control information in the uplink multicast forwarding table at the access device D by sending a control information update indication message thereto. The uplink multicast forwarding table is typically formed as table 1:

TABLE 1

| User side port | Multicast group | Uplink multicast address | Uplink multicast dedicated VLAN | Multicast bandwidth threshold (bit/s) | Status | Valid duration (second) |
|---|---|---|---|---|---|---|
| 1 | Family video of ZHANG San | 225.1.2.3 | 100 | 4M | valid | 10000 |
| 1 | One Piece | 225.1.2.2 | 100 | 3.5M | valid | 10000 |
| 1 | One Piece | 225.1.2.2 | 400 | 3.5M | valid | 10000 |
| 1 | Teaching Video for WOW | 225.1.2.4 | 300 | 4M | invalid | 10000 |
| 2 | Collection of the best in this round (NBA) | 228.1.4.5 | 200 | 4M | valid | 20000 |
| ... | ... | ... | ... | ... | ... | ... |
| n | Old films | 228.1.4.6 | 100 | 5M | valid | 50000 |

Besides, if there are some other network devices such as switches, other access devices between the access device D and multicast router E, uplink multicast controlling device F can configure these network devices, in order for them to support the uplink multicast dedicated VLAN. After that, when these network devices receive an uplink multicast packet having the tag of the uplink multicast dedicated VLAN, they will forward the uplink multicast packet to an upper level device according to the forwarding rule of multicast packets in the VLAN, until the uplink multicast packet gets to the multicast router.

In S3, uplink multicast controlling device F creates a new multicast control information like the first line (bold) in Table 1 in the uplink multicast forwarding table at access device D by configuration. For the ease in understanding, the items therein are defined as below:

user side port 1: since access device D has received the foresaid multicast transmission request message through user side port 1, the inserted multicast control information is naturally in correspondence with the user side port 1.

uplink multicast address 225.1.2.3: this is the multicast address assigned by the uplink multicast controlling device F to the multicast service which UE B requested to send. Those skilled in the art understand that multicast addresses and multicast groups are generally in one-to-one correspondence, 225.1.2.3 accordingly corresponds to multicast group "family video of ZHANG San".

uplink multicast dedicated VLAN 100: the uplink multicast dedicated VLAN assigned by uplink multicast controlling device F to the multicast service which UE B requested to send, numbered with 100. It is thus clear that the multicast groups "family video of ZHANG San" and "One Piece (OVA1)" corresponding to user side port (hereinafter referred to as "port") 1 share the same uplink multicast dedicated VLAN 100 with the multicast group "old films" corresponding to port n.

multicast bandwidth threshold 4M bits/s: the upper limit of bandwidth set by the uplink multicast controlling device F for multicast group "family video of ZHANG San". According to one preferable embodiment of the invention, when an uplink multicast stream containing multicast address 225.1.2.3 occupies a bandwidth that is larger than the multicast bandwidth threshold 4M bits/s, access device D will deny the multicast of this stream, or discard part of the packets thereof to comply to the bandwidth limit.

status: a kind of multicast control information which can be adjusted by manual configuration, or change automatically based on another item in the table "valid duration". For example, when an uplink multicast record comprises a "valid duration", it means how long the uplink multicast can last from when the uplink multicast passed the verification or when UE B started sending uplink multicast service data. When the duration has expired, uplink service data including this multicast address will be deemed as invalid and discarded by the access device D. Then, UE B can resend a multicast transmission request to the uplink multicast controlling device F in order for continuing providing the multicast service. Preferably, if the status of a multicast service has turned to "invalid", the access device D will delete the multicast control information of this multicast service automatically.

valid duration: see the description with respect to the concept "status".

When the same uplink multicast service data from the same UE reaches different multicast routers, the data can be denoted by a plurality of multicast control information items, and be differentiated by means of different uplink multicast dedicated VLANs, as shown in lines 2, 3 in Table 2.

Preferably, when the multicast transmission request message has passed the verification, uplink multicast controlling device F further determines whether UE B is allowed to launch a new multicast service according to the information in Table 2.

TABLE 2

| | Port | Upper limit of the amount of uplink multicast services | Upper limit of the total bandwidth of uplink multicast services bit/s |
|---|---|---|---|
| Access device D | 1 | 3 | 10M |
| | 2 | 3 | 20M |
| | ... | ... | ... |
| | N | 2 | 20M |

Table 2 can help to avoid the transmission of unauthorized uplink multicast data from the user side, and avoid the transmission of uplink multicast data from UEs for which uplink multicast function has not been activated. Table 2 can be pre-configured by network management software or a network manager, and maintained by the access device preferably.

According to a preferable embodiment of the invention based on Table 2, uplink multicast controlling device F determines how to respond to the multicast transmission request message of UE B according to the information stored in Table 2 maintained by the access device D. For example, only if the total bandwidth occupied by uplink multicast service data on user side port 1 is below the predetermined threshold in Table 2, the method enters step S3, otherwise the request message will be discarded, alternatively, a response denoting the request has been rejected is returned to UE B.

Moreover, uplink multicast controlling device F further controls the transmission of the request message according to the upper limit of amount of uplink multicast services shown in Table 2. That's to say, only if the total number of uplink multicast services carried by the port is below corresponding preset threshold, the method enters step S3.

Preferably, the uplink multicast controlling device F jointly considers the total bandwidth of uplink multicast services and the total number of uplink multicast services to control the transmission of the request message.

Therefore, only if the multicast transmission request from UE B has passed the further determination based on Table 2, the method enters step S3 to update the multicast control information at access device D. Surely, the limitation with regard to total number or bandwidth of uplink multicast services can be used in the verification in the step S2.

To sum up, when the multicast transmission request from UE B has been approved, uplink multicast controlling device F not only configures access device D in step 3, but also sends the verification result as to the multicast transmission request to UE B in step S4 as response and informs UE B of the corresponding uplink multicast address namely 225.1.2.3, the valid duration namely 10,000 seconds, the multicast bandwidth threshold namely 4M bits/second, and notifies UE B that it is fine to start the transmission of the uplink multicast service data stream as requested to the network side.

According to the invention, the start time of the transmission of the service data for an uplink multicast service can be controlled by the uplink multicast controlling device F dynamically based upon the request from the UE, or takes the form of static control wherein a manager configures it manually. Further, the multicast control information at the access device D can be updated by uplink multicast controlling device F based on the multicast transmission request from the UE, or by a manager through manual configuration. Moreover, the access device D can also update the multicast control information items in the uplink forwarding table by itself based on the "valid duration". Wherein, the uplink multicast controlling device F can be independent of the multicast transmission request from the UE when it updates the multicast control information.

After receiving the response from the uplink multicast controlling device F, UE B can start to send corresponding uplink multicast service immediately or wait for a period of time.

In step S5, UE B sends an uplink multicast packet with a multicast address 225.1.2.3 to the access device D.

According to the present invention, access device D will examine the uplink multicast packet from UE B in step S6, so as to determine if it should be allowed to be forwarded to multicast router E for multicast. The step S6 will be described in further details herebelow:

Access device D retrieves the multicast address from the multicast packet, i.e. 225.1.2.3, and compares it with the items in correspondence with port 1 in uplink multicast forwarding table. According to Table 1, it is clear that access device D will find the multicast address carried by the multicast packet is one of the legal multicast addresses corresponding to the port 1.

Consequently, a further determination can be carried out according to the bandwidth occupied by the multicast service stream to which the multicast packet belongs and based on the uplink multicast forwarding table. Specifically, the determination is about whether the bandwidth occupied by that multicast service stream has exceeded 4M bits/second.

In case that the occupied bandwidth for this service stream is below 4M bits/second, according to this embodiment of the invention, the access device D will allow the multicast packet for multicast transmission, and the method enters step S7 wherein the multicast packet will be sent to the multicast router E via the uplink multicast dedicated VLAN 100 between the multicast router E and the access device D. Wherein, if the multicast packet from UE B does not include the tag of that uplink multicast dedicated VLAN 100, the access device D will need to insert it into the multicast packet before sending it to multicast router E. Then there will be the multicast taking multicast router E as the root node.

If more than 4M bits/second of bandwidth has been occupied by the service stream, to avoid excessive usage of network resources, the access device D will not allow the uplink multicast forwarding of the multicast packet and discard it.

Withal, based on the transmission of the uplink multicast service data, some protocol packets in relation to the multicast group "family video of ZHANG San" are also needed to be transmitted between access device D and the multicast router E, such as the multicast routing information between the multicast router and user side multicast source, packets specific to the multicast group in IGMP/MLD. Preferably, the foresaid protocol packets should be transmitted in the uplink multicast dedicated VLAN 100 like the uplink multicast data stream. Wherein, the uplink multicast data stream is transmitted in unidirectional way whilst the transmission of those protocol packets can be bidirectional.

Therefore, in the network, the uplink multicast service provided by UE B can be requested on demand. If UE A needs to receive the multicast service data from UE B, in step S8, it will send a join request message to its dominating access device C, e.g. an IGMP Report message, including the multicast address for "family video of ZHANG San" namely 225.1.2.3, in order to request to join the multicast group "family video of ZHANG San".

If the access device C can take the role of a multicast proxy, after receiving the IGMP Report message from UE A, access device C preferably checks whether the multicast service stream corresponding to the multicast group "family video of ZHANG San" has been pre-pushed to it. If yes, the access device C will directly send corresponding multicast service data to UE A through the user side port connected to the subnet where UE A is located. If the multicast service stream has not been pre-pushed to access device C, access device C will forward this join request message to the multicast router E. As a response to the join request message, in step S8 thereafter, multicast router E will send the multicast service data received in step S7 to the access device C, which will be forwarded by access device C to UE A through the corresponding user side port.

Those skilled in the art understand that the process that UE A sends request to multicast router E for receiving the multicast service data originated from UE B can be realized according to existing IGMP/MLD protocols, and is the same as the process when requesting for receiving the downlink multicast service data provided by multicast source server G in FIG. 1 based on the prior art and its details are omitted.

According to this embodiment, the multicast address in an uplink multicast packet can be anyone of the followings: IPv4 multicast address, MAC address in correspondence with IPv4 multicast, IPv6 multicast address, MAC address in correspondence with IPv6 multicast address.

According to this embodiment, access device D preferably forwards all protocol packets in relation to the multicast group "family video of ZHANG San" received through port 1 into the uplink multicast dedicated VLAN 100. That's to say, uplink multicast dedicated VLAN 100 is only for the transmission of uplink multicast service data and protocol packets in relation to the uplink multicast service. Wherein, the protocols packets in relation to the uplink multicast service can be: the packets of the multicast routing protocols between the multicast router E and the user side router, in case port 1 is connected to a uplink multicast source via a user side router (which is different from the foresaid multicast router E at the network side). All unicast service data will be transmitted in the unicast VLAN associated with port 1.

Figure 3:
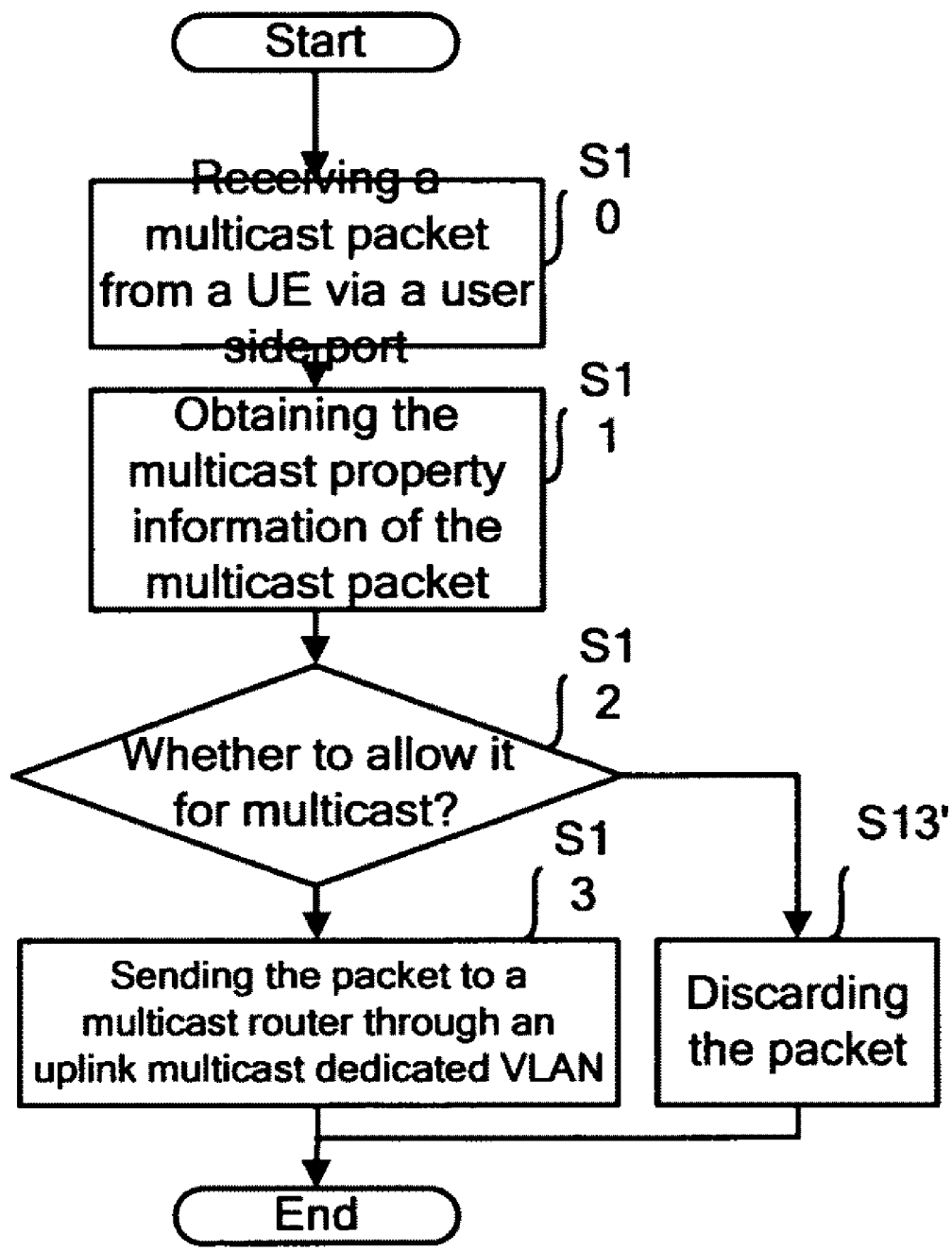
FIG. 3 shows a flowchart of the method for, in an access device of a communication network, controlling the uplink multicast service from a user equipment according to an embodiment of the invention.

FIG. 3 shows a flowchart of the method for, in an access device of a communication network, controlling the transmission of multicast service from a user equipment according to an embodiment of the invention. The first aspect of the invention as mentioned in the Summary of the Invention portion will be described with reference to FIG. 3 and in conjunction with FIG. 1, wherein access device D is taken as an example.

In step S10, access device D receives an uplink multicast packet from UE B via the user side port 1, wherein the uplink multicast packet includes a multicast address 225.1.2.3.

For the purpose of filtering uplink multicast packets, the access device D needs to be aware of the multicast property information of that uplink multicast packet such as the multicast address therein, the bandwidth occupied by the multicast service. According to a preferred embodiment of the invention, access device D determines whether to allow the multicast packet for multicast by considering both the multicast address included therein and the bandwidth occupied by the multicast service stream. Therefore, in step S11, access device D extracts the multicast address 225.1.2.3 from the multicast packet, and monitors the traffic of the uplink multicast service stream which said multicast packet belongs to, so as to be aware of the bandwidth occupation for that multicast service stream.

With the multicast address of the multicast packet and the bandwidth occupation for that multicast service stream, the access device D determines in step S12 whether the multicast packet should be allowed for uplink multicast forwarding. One embodiment of the detailed procedure of step S12 is as below:

Firstly, the access device D conducts a search in pre-stored uplink multicast forwarding table by using the multicast address 225.1.2.3, and determines whether 225.1.2.3 is one of the legal multicast addresses in correspondence with port 1. If the multicast address included in an uplink multicast packet is not any one of the legal multicast addresses in correspondence with the user side port, the method will enters step S13' wherein the uplink multicast packet will be discarded.

After it is determined that the multicast address included in the multicast packet is one of the legal multicast addresses corresponding to port 1, the access device D continues to determine whether the bandwidth occupied by the multicast service stream which said multicast packet belongs to has exceeded the preset multicast bandwidth threshold in the uplink forwarding table, e.g. 4M bits/second in Table 1. If the answer is no, the access device D will get a determining result suggesting that the multicast packet is allowed for uplink multicast forwarding. Otherwise, if the bandwidth occupation has exceeded 4M bits/second, the access device D preferably gets a determining result suggesting that the multicast packet is not allowed for uplink multicast forwarding, then the method enters step S13' wherein the uplink multicast packet will be discarded.

After getting the determining result suggesting that the multicast packet is allowed for uplink multicast forwarding in step S12, the method will enter step S13, wherein access device D will forward this multicast packet into the corresponding uplink multicast dedicated VLAN which is uplink multicast dedicated VLAN 100 according to Table 1, the packet finally gets to the multicast router E. In case that the uplink multicast packet from UE B has no VLAN tag in it, the access device D should also add the VLAN tag of VLAN 100 into the packet; if the packet includes a user side VLAN tag, the access device D will replace the user side VLAN tag with the tag of the uplink multicast dedicated VLAN 100 and then forward it to the multicast router E via the VLAN.

Besides, in the access control process applied to the multicast service provided by UE B, to assist the access device D in the transmission control of multicast data from the UEs later, the uplink multicast controlling device F updates the multicast control information at the access device D based on the multicast transmission request from the UE B. According to one embodiment of the invention, before step S12, the method further comprises the steps of:

receiving a control information update indication message from the uplink multicast controlling device F;

extracting update indication information from the control information update indication message, the update indication information preferably comprising the multicast address assigned by the uplink multicast controlling device F to UE B as well as corresponding multicast bandwidth threshold, etc;

according to the extracted update indication information, the access device D updates the multicast control information pre-stored by itself, in order for filtering uplink multicast packets coming later.

Of course, according to a simplified embodiment of the above, in step S12, the access device D can just determine whether the multicast address included in the uplink multicast packet is one of the legal multicast addresses corresponding to the user side port, without further limitation using the multicast bandwidth threshold.

Figure 4:
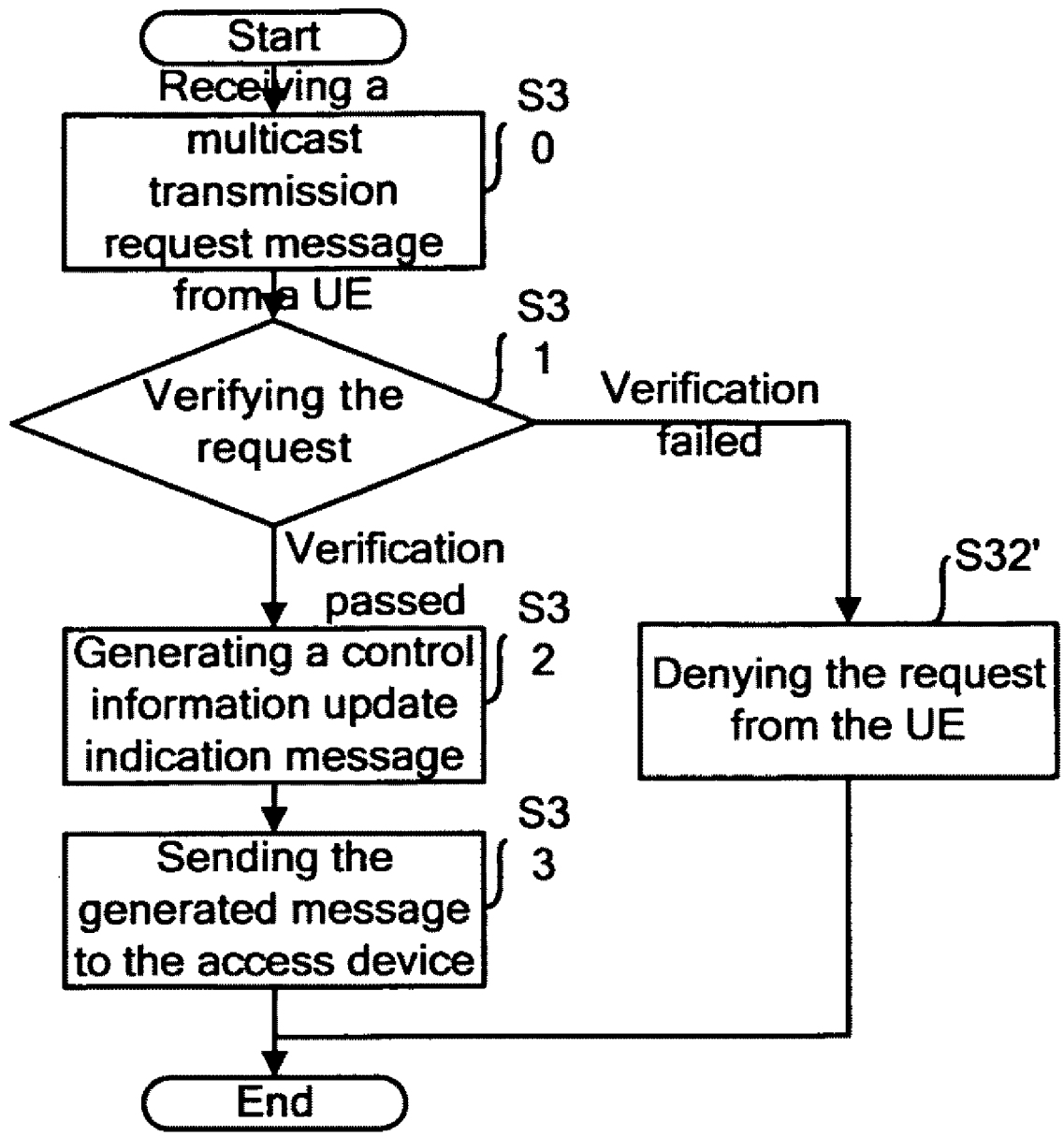
FIG. 4 shows a method for, in an uplink multicast controlling device of a communication network, assisting the control of uplink multicast service from a user equipment, according to an embodiment of the invention.

FIG. 4 shows a method for, in an uplink multicast controlling device of a communication network, assisting the control of uplink multicast service from a user equipment, according to an embodiment of the invention. The second aspect of the invention as mentioned in the Summary of the Invention portion will be described with reference to FIG. 4 and in conjunction with FIG. 1.

In step S30, the uplink multicast controlling device F receives the multicast transmission request message originated from UE B and forwarded by the access device D, wherein the request message is for request the uplink multicast controlling device F to allow UE B to provide multicast service to the network.

Then, in step S31, the uplink multicast controlling device F verifies the multicast transmission request message. To be specific, the verification is based on the user information contained in the message and user information, multicast permission information pre-stored by the uplink multicast controlling device F for verification.

If the multicast transmission request message has passed the verification, the uplink multicast controlling device F will generate a control information update indication message in step S32. According to a preferable embodiment of the invention, the message includes associated multicast control information as followings: user side port 1; uplink multicast address 225.1.2.3; uplink multicast dedicated VLAN 100; multicast bandwidth threshold 4M bits/second; valid duration 10,000 seconds. The updated multicast control information will be used by the access device D to filter uplink multicast packets coming later.

Further, the uplink multicast controlling device F also responses to the multicast transmission request message from UE B. To be specific, the uplink multicast controlling device F informs UE B of the assigned multicast address, and notifies UE B that it is fine to send the uplink multicast service data as requested.

If the multicast transmission request message is not approved, the uplink multicast controlling device F will return a response message indicating that the request for multicast service data transmission has been denied to UE B. Certainly, it is also fine for the uplink multicast controlling device F to make no response.

Besides, after the multicast transmission request message has been approved, preferably, the uplink multicast controlling device F will acquire information like Table 2 from the access device D, in order to determine whether to enters step S32 to generate a control information update message.

Figure 5:
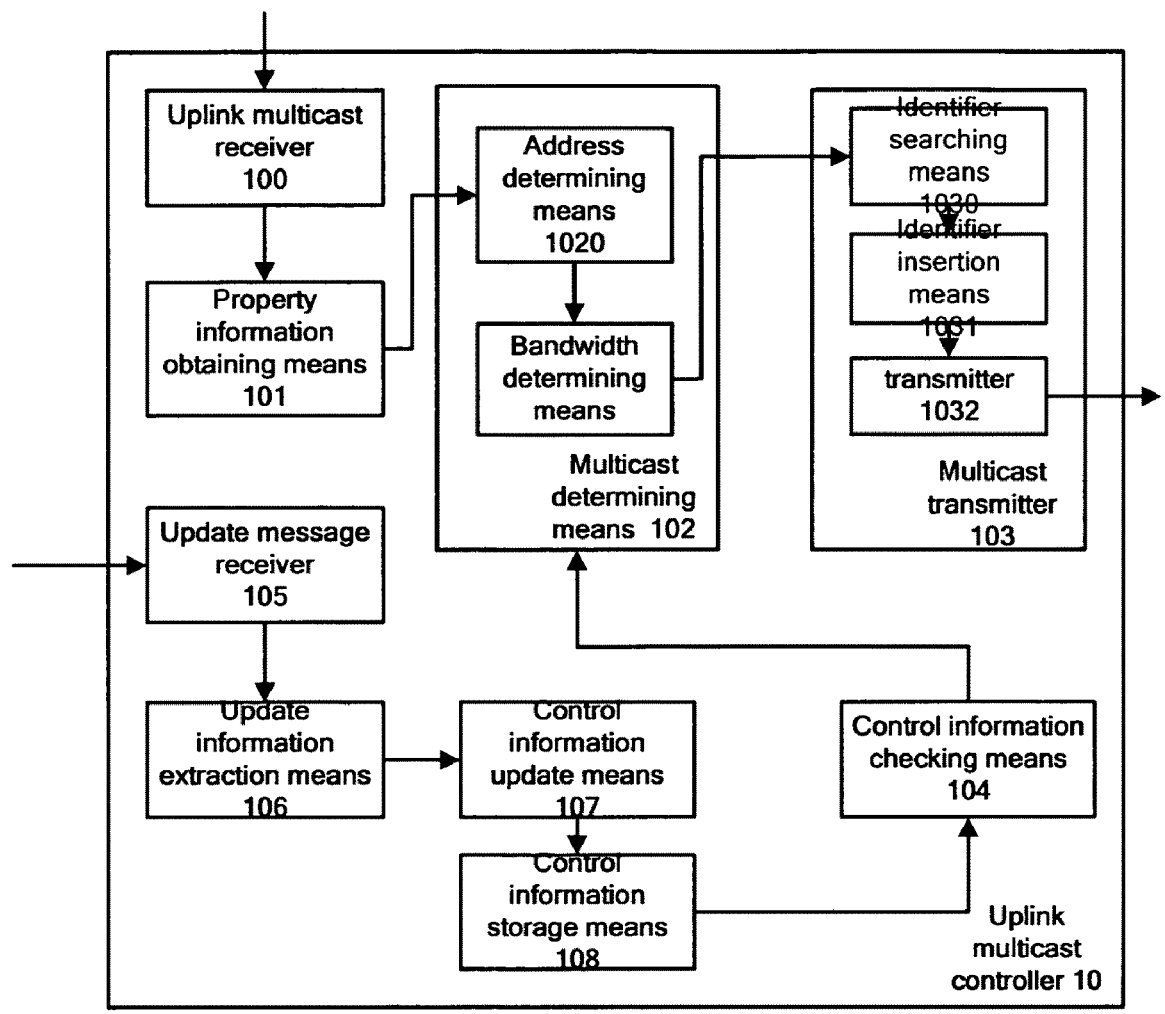
FIG. 5 shows a block diagram of an uplink multicast controller for, in an access device of a communication network, controlling the uplink multicast service from a user equipment according to an embodiment of the invention.

FIG. 5 shows a block diagram of an uplink multicast controller for, in an access device of a communication network, controlling the uplink multicast service from a user equipment according to an embodiment of the invention. The third aspect of the invention as mentioned in the Summary of the Invention portion will be described with reference to FIG. 5 and in conjunction with FIG. 1. Wherein, the access device D is taken as an example.

The uplink multicast controller 10 comprises: an uplink multicast receiver 100, an property information obtaining means 101, a multicast determining means 102, a multicast transmitter 103, a control information checking means 104, an update message receiver 105, an update information extraction means 106, a control information update means 107 and a control information storage means 108. Wherein, the multicast determining means 102 further comprises: an address determining means 1020 and a bandwidth determining means 1021; the multicast transmitter 103 further comprises: an identifier searching means 1030, an identifier adding means 1031 and a transmitter 1032.

Firstly, the uplink multicast receiver 100 receives an uplink multicast packet from UE B via the user side port 1 of the access device D, wherein the uplink multicast packet includes a multicast address 225.1.2.3.

For the purpose of filtering uplink multicast packets, the access device D needs to be aware of the multicast property information of that uplink multicast packet such as the multicast address therein, the bandwidth occupied by the multicast service traffic. According to a preferred embodiment of the invention, access device D determines whether to allow the multicast packet for multicast by considering both the multicast address included therein and the bandwidth occupied by the corresponding multicast service stream. Therefore, the property information obtaining means 101 extracts the multicast address 225.1.2.3 from the multicast packet, and monitors the traffic of the uplink multicast service stream which said multicast packet belongs to, so as to be aware of the bandwidth occupation for that multicast service stream.

The control information checking means 104 is configured to searching for multicast control information corresponding to the user side port 1 in the information stored in the control information storage means 108 and provide the same to the multicast determining means 102.

Further, the property information obtaining means 101 also provide the multicast determining means 102 with the multicast address of the multicast packet and the bandwidth occupied by the service stream which the packet belongs to. One embodiment of the working flow of components in the multicast determining means 102 is as following:

Firstly, the address determining means 1020 determines whether 225.1.2.3 is one of the legal multicast addresses in correspondence with port 1. If the multicast address included in an uplink multicast packet is not any one of the legal multicast addresses in correspondence with the corresponding user side port, the uplink multicast packet will be discarded.

The address determining means 1020 will inform the bandwidth determining means 1021 of the determining result, which will, based on the result that showing that the multicast address is legal, determine whether the bandwidth occupied by the multicast stream which the multicast packet belongs to has exceeded the preset multicast bandwidth threshold in the uplink forwarding table, e.g. 4M bits/second in Table 1. The bandwidth determining means 1021 will then let the identifier searching means 1030 know its determining result.

On the basis of that the multicast address included in the multicast packet is legal, if the determining result got by the bandwidth determining means 1021 shows that the bandwidth occupied by the multicast service stream hasn't exceeded 4M bits/second, it means the multicast packet should be allowed for uplink multicast forwarding. Otherwise, if it has exceeded 4M bits/second, the multicast determining means 102 preferably denies the uplink multicast forwarding of the multicast packet, and asks another sub-means (not shown in the figures) to discard the packet.

According to this embodiment, the bandwidth determining means 1021 preferably performs the determining process as to the bandwidth occupied by the multicast stream only when the determining result provided by the address determining means 1020 shows that the multicast address included in the multicast packet is legal, therefore, in case that the bandwidth determining means 1021 gets a determining result showing that the bandwidth occupied by the multicast stream has not exceeded the upper limit, the multicast transmitter 103 will forward the multicast packet into the uplink multicast dedicated VLAN which is uplink multicast dedicated VLAN 100 according to Table 1.

The working flow of multicast transmitter 103 is as follows: firstly, the identifier searching means 1030 will search in the uplink forwarding table for the VLAN Tag of the uplink multicast dedicated VLAN, which will be provided to the identifier adding means 1031. The identifier adding means 1031 then replaces the original VLAN Tag in the multicast packet with the identifier of VLAN 100, and provides the updated uplink multicast packet to the transmitter 1032, which will send the updated uplink multicast packet into network of VLAN 100.

Besides, in the access control process applied to the multicast service provided by UE B, to assist the access device D in the transmission control of multicast data from the UEs later, the uplink multicast controlling device F updates the multicast control information at the access device D based on the multicast transmission request from the UE B. According to one embodiment of the invention, the uplink multicast controller 10 further comprises the follow components to update the multicast control information:

an update message receiver 105, which is configured to receive the control information update indication message from the uplink multicast controlling device F;

an update information extraction means 106, which is configured to extract update indication information from the control information update indication message received by the update message receiver 105, the update indication information preferably comprising the multicast address assigned by the uplink multicast controlling device F to UE B as well as corresponding multicast bandwidth threshold, etc;

a control information update means 107, which is configured to, according to the extracted update indication information, the access device D updates the multicast control information pre-stored by itself, in order for filtering uplink multicast packets coming later.

Wherein, the control information storage means 108 can be set inside the uplink multicast controller 10, or in any database-type server which is independent from the access device D, and accessed by the uplink multicast controller 10 in order for updating or searching for the multicast control information. Therefore, the control information storage means 108 is optional in the uplink multicast controller 10.

Of course, according to a simplified embodiment of the above, the multicast determining means 102 can just determine whether the multicast address included in the uplink multicast packet is one of the legal multicast addresses corresponding to the corresponding user side port. Therefore, in this variation, the bandwidth determination 1022 is optional.

Figure 6:
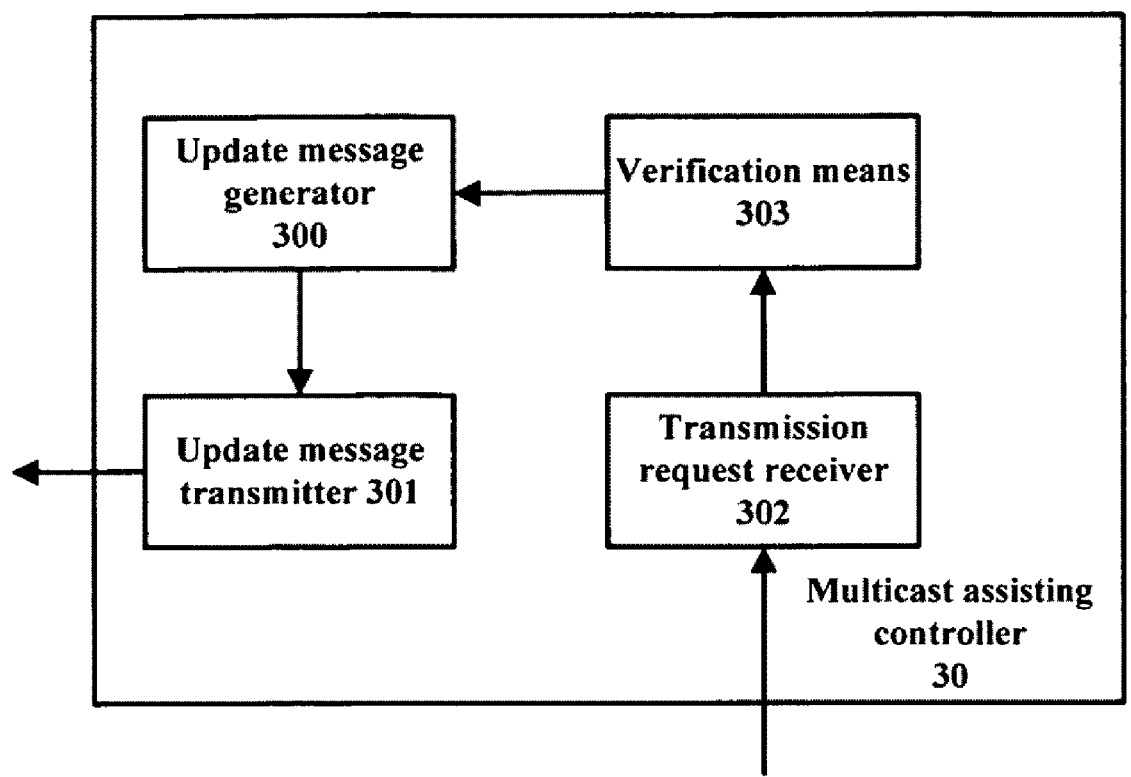
FIG. 6 shows a block diagram of a multicast assisting controller for, in an uplink multicast controlling device of a communication network, assisting the sending of multicast packet from a user equipment according to an embodiment of the invention.

FIG. 6 shows a bock diagram of a multicast assisting controller for, in an uplink multicast controlling device of a communication network, assisting the control of uplink multicast service from a user equipment according to an embodiment of the invention. The fourth aspect of the invention as mentioned in the Summary of the Invention portion will be described with reference to FIG. 6 and in conjunction with FIG. 1.

The multicast assisting controller 30 comprises: an update message generator 300, an update message transmitter 301, a transmission request receiver 302 and an verification means 303.

Firstly, the transmission request receiver 302 receives the multicast transmission request message originated from UE B and forwarded by the access device D; wherein the request message is for request the uplink multicast controlling device F to allow UE B to provide multicast service to the network.

Then, the verification means 303 will verify the multicast transmission request message. To be specific, the verification is based on the user information contained in the message and user information, multicast permission information prestored by the uplink multicast controlling device for verification.

If the multicast transmission request message has passed the verification, the update message generator 300 will generate a control information update indication message. According to a preferable embodiment of the invention, the message includes associated multicast control information as followings: user side port 1; uplink multicast address 225.1.2.3; uplink multicast dedicated VLAN 100; multicast bandwidth threshold 4M bits/second; valid duration 10,000 seconds. The updated multicast control information will be used by the access device D to filter uplink multicast packets coming later.

The generated control information update indication message will be sent to the access device D by the update message transmitter 301.

Further, the uplink multicast controlling device F also responses to the multicast transmission request message from UE B. To be specific, the uplink multicast controlling device F informs UE B of the assigned multicast address, and notifies UE B that it is fine to send the uplink multicast service data as requested.

If the multicast transmission request message is not approved, the uplink multicast controlling device F will return a response message indicating that the request for multicast service data transmission has been denied to UE B. Certainly, it is also fine for the uplink multicast controlling device F to make no response.

Besides, after the multicast transmission request message has been approved, preferably, the uplink multicast controlling device F will acquire information like Table 2 from the access device D by using an acquisition means not shown in the figures, in order to determine by a determining means not shown in the figures whether the update message generator 300 should generate a control information update message.

The embodiments of the present invention have been described above. It is understandable by those skilled in the art that the present invention is not limited to specific system, device or protocol, and various modifications or amendments can be made without departing from the scope and spirit of the scope of the attached claims.

What is claimed is:

1. A method for, in an access device of a communication network, controlling the uplink multicast service from a user equipment, comprising:
   a. receiving a multicast packet from the user equipment through a user side port of said access device;
   b. obtaining the multicast property information of the multicast packet;
   d. according to the multicast property information of the multicast packet and uplink multicast control information corresponding to said user side port, determining whether the uplink multicast forwarding of the multicast packet is allowed;
   e. if the uplink multicast forwarding of the multicast packet is allowed,
      receiving, from a controlling device at the access device, a control information update indication message including update indication information of uplink multicast control information in correspondence with said user side port on the access device, and
      sending, in response to the control information update indication message, the multicast packet to a multicast router via a uplink multicast dedicated VLAN between the access device and the multicast router, which will then provide multicast service to other user equipments,
   wherein the uplink multicast dedicated VLAN is shared by the uplink multicast service of the other user equipments.

2. A method according to claim 1, wherein
before the step d, the method further comprises,
c. searching for the multicast control information in correspondence with said user side port;
before the step d, the method further comprises,
   extracting the update indication information from said control information update indication message;
   based on said update indication message, updating the uplink multicast control information in correspondence with said user side port, so as to generate updated uplink multicast control information in correspondence with said user side port;
the step d further comprises,
   determining, according to the property information of the multicast packet as well as the updated uplink multicast control information in correspondence with said user side port, whether the multicast packet is allowed for uplink multicast forwarding.

3. A method according to claim 1, wherein
the multicast property information comprises the multicast address included in the multicast packet, the step b further comprises,
   extracting, from the multicast packet, the multicast address included therein;
   said multicast control information comprises at least one legal multicast address in correspondence with said user side port;
the step d further comprises,
   determining whether the multicast address included by the multicast packet is one of the legal multicast addresses in correspondence with the user side port;
   in case that the multicast address included by the multicast packet is one of the legal multicast addresses in correspondence with the user side port, determining to allow the multicast packet for uplink multicast forwarding;
wherein the multicast property information further comprises the bandwidth occupied by the multicast service to which the multicast packet belongs,
the step b further comprises,
   monitoring the bandwidth occupied by the multicast service which the multicast packet belongs to based on the multicast packet;
said multicast control message further comprises multicast bandwidth threshold corresponding to said at least one legal multicast address,
the step d further comprises,
   determining whether the bandwidth occupied by the multicast service to which the multicast packet belongs is less than or equal to the corresponding multicast bandwidth threshold;
   if the multicast address included by the multicast packet is one of the legal multicast addresses in correspondence with the user side port, and the bandwidth occupied by the multicast service to which the multicast packet belongs is less than or equal to the corresponding multicast bandwidth threshold, determining to allow the multicast packet for uplink multicast forwarding.

4. A method according to claim 1, wherein
the uplink multicast dedicated VLAN is used to transmit uplink multicast data from user equipments, the uplink multicast control information includes the tags of at least one uplink multicast dedicated VLAN in respective correspondence with the at least one legal multicast address,
the step e further comprises,
  e1. if the multicast packet is allowed for multicast, searching for the tag of the uplink multicast dedicated VLAN corresponding to the multicast address included by the multicast packet among the uplink multicast control information;
  e2. inserting the tag of said uplink multicast dedicated VLAN into said multicast packet, so as to generate a new multicast packet;
  e3. sending the new multicast packet to the multicast router via said uplink multicast dedicated VLAN.

5. A method for, in an uplink multicast controlling device of a communication network, assisting the control of uplink multicast service from a user equipment, comprising:
  A. receiving a multicast transmission request message forwarded by said access device and originated from the user equipment under the domination of an access device, wherein the access device receives the multicast transmission request message via a user side port, the multicast transmission request message is configured to request the uplink multicast controlling device to allow the user equipment to send uplink multicast data;
  after step A and before step B, the method further comprises,
    verifying the received multicast transmission request message, so as to get a verification result;
  B. generating a control information update indication message including update indication information of uplink multicast control information in correspondence with the user side port on the access device dominated by the uplink multicast controlling device;
  the step B further comprises,
    generating said control information update indication message, including update indication information for updating the uplink multicast control information in correspondence with said user side port on said access device;
    in case that the verification result shows that the multicast transmission request message has passed the verification, generating said control information update indication message including said update indication information for updating the uplink multicast control information in correspondence with said user side port on said access device
  C. sending the generated control information update indication message to said access device.

6. A method according to claim 5, wherein the update indication information is configured to update at least one of the following which are in correspondence with said user side port on said access device,
  at least one legal multicast address;
  multicast bandwidth threshold corresponding to said at least one multicast address;
  valid duration of services;
  the tags of uplink multicast dedicated VLANs.

7. An uplink multicast controller for, in an access device of a communication network, controlling the uplink multicast service from a user equipment, comprising:
  an uplink multicast receiver configured to receive a multicast packet from the user equipment through a user side port of said access device;
  a property information obtaining means configured to obtain the multicast property information of the multicast packet;
  a multicast determining means configured to, according to the multicast property information of the multicast packet and uplink multicast control information corresponding to said user side port, determine whether the uplink multicast forwarding of the multicast packet is allowed;
  an update message receiver configured to receive, from a managing device dominating said access device, a control information update indication message including update indication information for updating uplink multicast control information in correspondence with said user side port;
  a multicast transmitter configured to, if the uplink multicast forwarding of the multicast packet is allowed,
  send, in response to the control information update indication message, the multicast packet to a multicast router via a uplink multicast dedicated VLAN between the access device and the multicast router, which will then provide multicast service to other user equipments,
  wherein the uplink multicast dedicated VLAN is shared by the uplink multicast service of the other user equipments.

8. An uplink multicast controller according to claim 7, further comprising:
  control information checking means configured to search for the multicast control information in correspondence with said user side port;
  an update information extraction means configured to extract the update indication information from said control information update indication message;
  a control information update means configured to, based on said update indication information, update the uplink multicast control information in correspondence with said user side port, so as to generate updated uplink multicast control information in correspondence with said user side port;
  the multicast determining means is further configured to,
    determine, according to the property information of the multicast packet as well as the updated uplink multicast control information in correspondence with said user side port, whether the multicast packet is allowed for uplink multicast forwarding.

9. An uplink multicast controller according to claim 7, wherein
  the multicast property information comprises the multicast address included in the multicast packet,
  the property information obtaining means is further configured to,
    extract, from the multicast packet, the multicast address included therein;
  said multicast control information comprises at least one legal multicast address in correspondence with said user side port;
  the multicast determining means further comprises,
    an address determining means configured to determine whether the multicast address included by the multicast packet is one of the legal multicast addresses in correspondence with the user side port, so as to determine whether to allow the multicast packet for uplink multicast forwarding;

the multicast property information further comprises the bandwidth occupied by the multicast service to which the multicast packet belongs, the property information obtaining means further configured to,
- monitor the bandwidth occupied by the multicast service which the multicast packet belongs to based on the multicast packet;

said multicast control message further comprises multicast bandwidth threshold corresponding to said at least one legal multicast address, said multicast determining means further comprises,
- a bandwidth determining means configured to determine whether the bandwidth occupied by the multicast service which the multicast packet belongs to is less than or equal to the corresponding multicast bandwidth threshold, so as to determine whether to allow the multicast packet for uplink multicast forwarding.

10. An uplink multicast controller according to claim 7, wherein the uplink multicast dedicated VLAN is used to transmit uplink multicast data from user equipments, the uplink multicast control information includes the tags of at least one uplink multicast dedicated VLAN in respective correspondence with the at least one legal multicast address, the multicast transmitter further comprises:
- an identifier searching means configured to, if the multicast packet is allowed for multicast, searching for the tag of the uplink multicast dedicated VLAN corresponding to the multicast address included by the multicast packet among the multicast control information;
- an identifier insertion means configured to, insert the tag of said uplink multicast dedicated VLAN into said multicast packet, so as to generate a new multicast packet;
- a transmitter configured to send the new multicast packet to the multicast router via said uplink multicast dedicated VLAN.

11. A multicast assisting controller for, in an uplink multicast controlling device of a communication network, assisting the control of uplink multicast service from a user equipment, comprising:
- an update message generator configured to generate a control information update indication message including update indication information for updating uplink multicast control information in correspondence with a user side port on an access device dominated by the uplink multicast controlling device;
- an update message transmitter configured to send the generated control information update indication message to said access device;
- a transmission request receiver configure to receive a multicast transmission request message forwarded by an access device and originated from a user equipment under the domination of said access device, wherein the access device receives the multicast transmission request message via a user side port, the multicast transmission request message is configured to request the uplink multicast controlling device to allow the user equipment to send uplink multicast data;
- the update message generator is further configured to,
  - generate said control information update indication message, including update indication information for updating the multicast control information in correspondence with said user side port on said access device.

12. A multicast assisting controller according to claim 11, further comprising:
- a verification means configured to verify the received multicast transmission request message, so as to get a verification result;
- the update message generator is further configured to,
  - in case that the verification result shows that the multicast transmission request message has passed the verification, generating said control information update indication message including said update indication information for updating the multicast control information in correspondence with said user side port on said access device.

13. A multicast assisting controller according to claim 11, wherein the update indication information is configured to update at least one of the following which are in correspondence with said user side port on said access device,
- at least one legal multicast address;
- multicast bandwidth threshold corresponding to said at least one multicast address;
- valid duration of services;
- the tags of uplink multicast dedicated VLANs.

* * * * *